A. & J. F. THOMPSON.
NUT-LOCKS.

No. 183,873.

Patented Oct. 31, 1876.

Witnesses.
Chas. R. Drew
C. F. Perkins

Inventor.
Albert Thompson
John F. Thompson.

UNITED STATES PATENT OFFICE.

ALBERT THOMPSON AND JOHN F. THOMPSON, OF STARK, NEW HAMPSHIRE.

IMPROVEMENT IN NUT-LOCKS.

Specification forming part of Letters Patent No. 183,873, dated October 31, 1876; application filed September 16, 1874.

*To all whom it may concern:*

Be it known that we, ALBERT THOMPSON and JOHN F. THOMPSON, of Stark, in the county of Coos and State of New Hampshire, have invented an Improved Device for Securing Nuts to Bolts, of which the following is a specification:

It is well known, by people familiar with railways, that great trouble is experienced in the loosening of the bolts used to couple the track, caused by the jar of the passing trains.

The object of our invention is to secure the nuts on such bolts in such a manner that it shall be impossible for them to become loosened. This we accomplish by means of the serrated washer, which is fully shown in the accompanying drawing.

Figure 1:
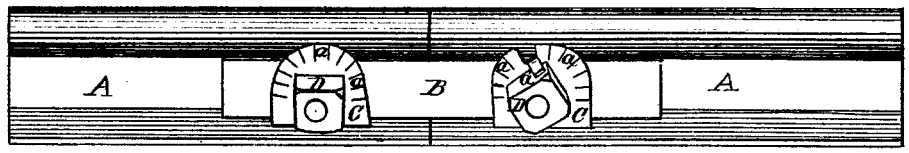
Figure 2:
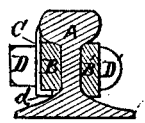

In the drawing, Figure 1 represents a side view of a railroad-track with two rails united with bolts with our invention applied. Fig. 2 is a sectional view of the same through the center of a bolt.

A is the rail; B, a piece of wood or metal, through which the bolts are to pass. C is the serrated washer; D D, bolts; $a\ a\ a$, the several parts of the serrated washer, which are to be turned down upon the head of the nut, as shown at $a'$, to hold the nut in its place and prevent it being turned.

The washer C is formed of sheet metal, with an arched or curved upper edge, into which slits are cut, extending for a short distance toward the center of the plate, and straight lower edge $d$, which, when the washer is in place, is bent under the fish-plate B, as shown in Fig. 2.

The manner of using this washer, or our improved nut-lock, is as follows: After the bolts D are inserted in place, through the fish bars and rails, the washers C C are then placed on the bolts and the nuts screwed up tight. One or more of the serrated parts or tongues $a$ of the washers are then bent over against the faces of the nut, and the lower edge of the washer bent under the fish-plate. Thus the washer is prevented from turning by its flange under the fish-plate and the nut from turning by the tongues of the washer.

The object of making the washer with a curved upper edge, into which the tongues are formed, is, so that no matter at what slight angle or position the nut may be, either square or oblique, it will be in position to receive some one or more of the tongues $a$.

Instead of applying the washer in position, and then bending its lower edge under the fish-plate, the edge of the washer may be first bent or formed in this way, so as to fit right under the plate. All that would then be necessary to lock the parts would be to bend down one of the tongues $a$ onto the nut.

Having thus described our invention, what we claim as new, and desire to secure by Letters Patent, is—

In a railroad nut-lock, in combination with the fish-plates B, bolts D′, and nuts D, the washer C, formed with a curved upper slitted edge, $a\ a$, and lower straight-flanged edge $d$, which extends under the fish-plate B, as and for the purposes described.

ALBERT THOMPSON.
JOHN F. THOMPSON.

Witnesses:
L. P. ADLEY,
BENJAMIN THOMPSON.